United States Patent Office

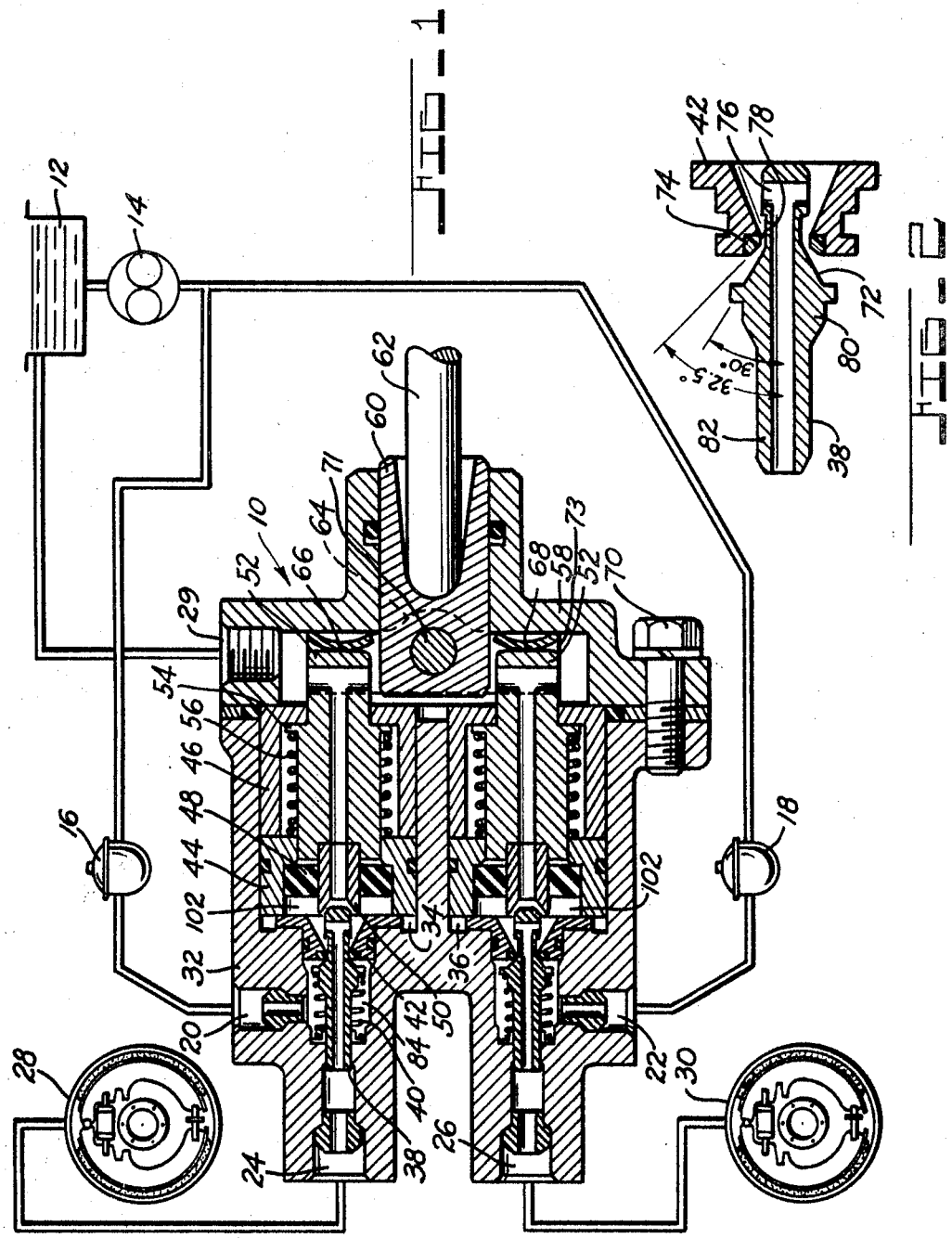

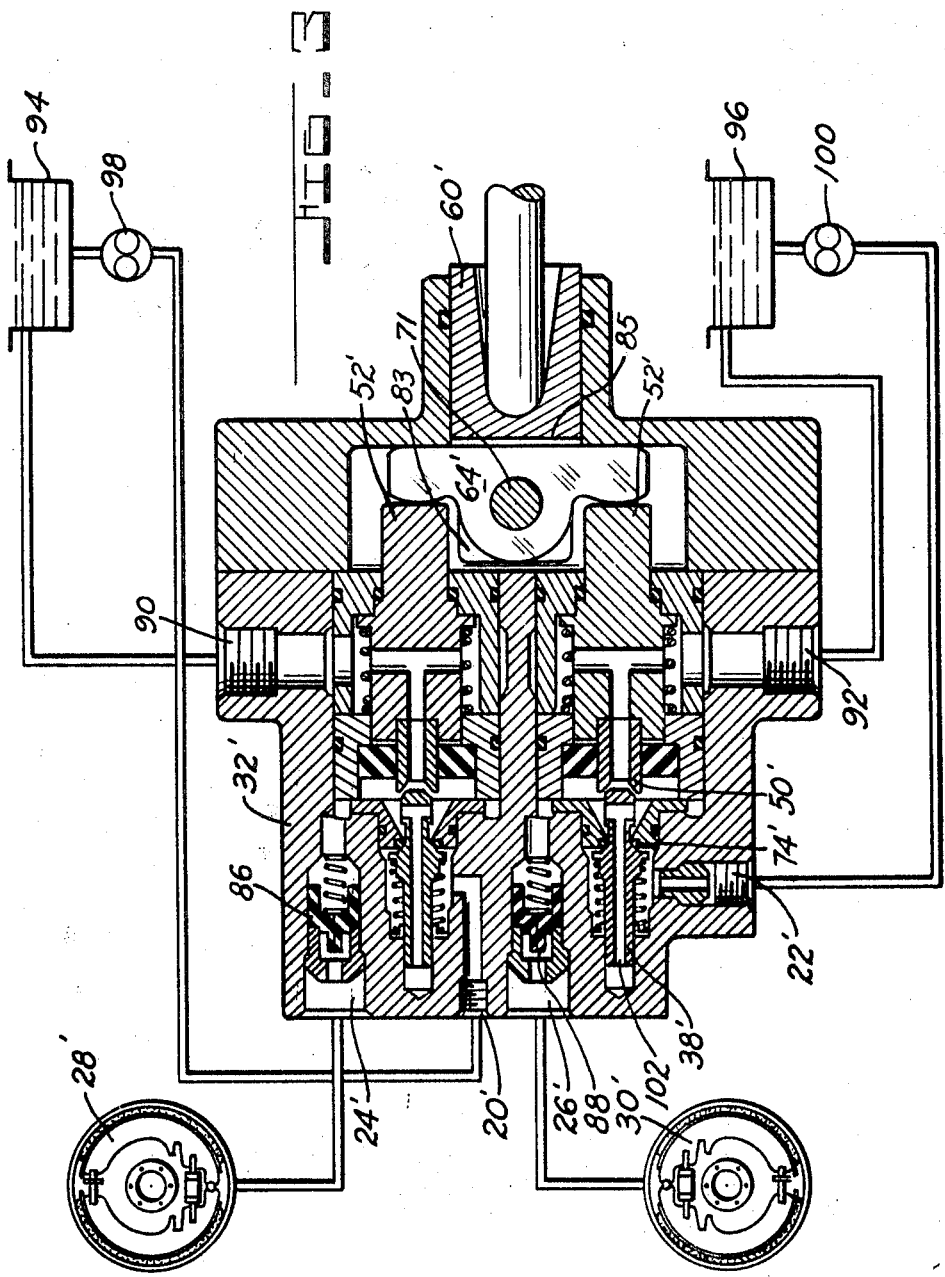

3,459,226
Patented Aug. 5, 1969

3,459,226
FLUID PRESSURE CONTROL VALVE
Harold B. Schultz, South Bend, Ind., assignor to The Bendix Corporation, a corporation of Delaware
Filed Dec. 22, 1966, Ser. No. 603,851
Int. Cl. F16k *1/12;* F15b *11/16, 13/14*
U.S. Cl. 137—627.5                      7 Claims

ABSTRACT OF THE DISCLOSURE

A fluid pressure control valve operated by an articulated link having a tubular poppet valve cooperating with an annular valve seat to control the delivery of a supply pressure to a fluid discharge port or to connect the fluid discharge port to a return port means. The tubular valve poppet is provided with a valve flange that cooperates with a ring having a face of different angle than the valve flange to insure adequate seating of the flange of the poppet on the face of the valve seat to prevent system leak down.

SUMMARY

It is an object of this invention to provide a valve means for controlling the delivery of high pressure fluid that employs an articulated link connected to an operator-operated member for actuating a valve operating member.

It is a more detailed object of this invention to provide an articulated link with a cam surface that contacts the valve operating member on a line substantially in the same plane as the articulation of the link to the operator-operated control member.

Another related object to the aforementioned is to provide a hydraulic valve means for controlling high pressure with an operating mechanism which has limited scuffing action so as to reduce wear and stickiness in operation of the valve.

Another object of this invention is to provide a valve poppet and valve seat arrangement which are arranged so that when in engagement pressure forces tend to insure the engagement of the valve poppet and valve seat.

A still further object of this invention is to provide a valve seat with an area of limited deformation for contact with a valve poppet to provide a valve arrangement having a better seat being maintained with lower forces.

DESCRIPTION OF THE DRAWINGS

FIGURE 1 shows a fluid pressure valve in cross section connected with a hydraulic system for controlling the delivery of brake pressures to a vehicle's brakes also shown in schematic;

FIGURE 2 is an enlarged view of the valve poppet and valve seat arrangement in the valve means of FIGURE 1; and FIGURE 3 is a cross sectional view of a modified valve control means inserted in a system similar to that of FIGURE 1.

DETAILED DESCRIPTION

While it should be noted that the valve apparatus of this invention is applicable to any hydraulic system, as those skilled in the art to which it relates, will undoubtedly recognize, it has occurred to the inventor to be particularly applicable in a full hydraulic power braking system. In such a system a valve 10 according to the principles of this invention is connected to a hydraulic system comprising a fluid reservoir 12, and a hydraulic pump 14 that is capable of developing pressures for two separate accumulators 16 and 18. Each of the accumulators is connected to respective inlet ports 20 and 22 of the valve means 10 which is also provided with fluid discharge ports 24 and 26 and a common return port 29, with reference to the structure of FIGURE 1, that communicates vacuum to the reservoir 12. The outlet ports 24 and 26 are connected by appropriate conduits to the respective brake assemblies 28 and 30.

The valve means 10 is constructed preferably by first casting a housing 32 with a plurality of bores 34 and 36 that are finished machined after the cross drilling for the ports 20, 22, 24 and 26 has been accomplished. After the machining of the bores 34 and 36, a tubular valve poppet 38 is placed in each of the bores with a spring 40 therearound to urge the poppet against a seat 42 that is held against a shoulder of the bore by means of a collar 44 between a retainer cup 46 and the valve seat 42. The collar 44 is provided internally with a reaction and sealing disc 48 which is carried by a tubular projection 50 of a valve operating member 52 that is slidably carried through an opening in the cup shaped member 46. The valve operating member 52 is provided with a flange 54. A spring 56 is prior to the assembly within the bore of the collar 44 and the cup shaped member 46 inserted between the flange 54 and the collar 44 to urge the valve operating member to a position where the flange is in abutment with the cup-shaped member 46.

In that the elements within the adjacent bore 36 are identical to those in the bore 34 just described, it is not deemed necessary to again refer to each and every one of these pieces in the bore 36. The drawing is believed to be sufficiently clear to show that they are obviously arranged in the same manner.

Thereafter a cap 58 slidably mounting an operator-operated member comprising plunger 60 and push rod 62 to which is articulated a link 64 having radially disposed cam surfaces 66 and 68. The cap 58 is affixed to the open end of the housing 32 by means of bolts 70 to maintain the aforementioned elements within the bores 34 and 36 and provide line contact between the cam surfaces 66 and 68 and the valve operating members 52. The link 64 is articulated to plunger 60 by a pin 71, and link 64 is a box or channel structure having sides 73 on each side of operating member 52.

With reference now to FIGURE 2 the valve poppet 38 and the valve seat 42 are shown in clear detail to include a valve surface 72 on the poppet that is arranged to cooperate with a valve face 74 of the valve seat 72. The valve face 74 is preferably constructed from a Delrin or similar type plastic material to have an angle with respect to the longitudinal axis of the poppet and valve seat which is shown to be greater than the angle of the surface 72 of the valve poppet with respect to the same axis.

By incorporating a ring of plastic which has a limited degree of deformability and low erosion characteristics while maintaining high resilient properties, I have insured the desired seating of the poppet 38 on the seat 42 with the use of a spring 40. A tubular poppet 38 is cross drilled as at 76 to permit fluid communication through the tubular poppet to either communicate the ports 24, 26 with the return port 29 or to communicate the ports 20 and 22 to the respective ports 24 and 26. Furthermore, the tubular poppet 38 is constructed so that the portion 78 ahead of the valve surface 72 is of slightly less diameter than the trailing portion 38 behind the valve flange 80 thereof. Thus, the seating area between the ring 74 and the surface 72 of the poppet 38 will begin on the line equal to the diameter of the portion 82 of the tubular poppet so that the high pressure fluid about the tubular poppet 38 in the valve chamber 84 (see FIGURE 1) will have the effect of increasing the seating area to prevent an unbalance of pressure that would operate to open the valve.

As for the structure of FIGURE 3, it is essentially comprised of the same elements internally of the housing 32' as in the structure of FIGURE 1. Notable differences between the two are in the plunger and link assembly and in the incorporation of residual pressure check valves 86 and 88 in the outlet ports 24' and 26' respectively. It should also be noted that the housing is provided with two return ports 90 and 92, as distinguished from the single return port 29 of the structure of FIGURE 1 to accommodate separate fluid pressure systems comprising reservoirs 94 and 96 and their associated pumps 98 and 100 feeding the inlets 20' and 22' independently of each other. The articulated link 64' is shown to be of a more substantial construction on the end of the plunger 60' of the operator-operated control member. The link 64' is formed as a beam and does not envelop the ends of the plungers 52'. The plunger 60' is formed to have ears 83 on each side of link 64' through which pin 71' mates the plunger and link as a subassembly. The plunger also is provided with an abutment surface 85 spaced from link 64' such that limited pivoting of the link is permitted prior to abutment therewith. Finally, the valve poppet 38' is provided with an axial passage 102 to provide communication of working pressure to assist the seating of poppet 38' on ring 74' and/or projection 50', as would also be true of the construction of FIGURE 1.

OPERATION

In operation, both the units of FIGURE 1 and FIGURE 2 operate in a similar manner and therefore the description of the operation of FIGURE 1 is deemed to be sufficiently illustrative of the operation of FIGURE 3.

In operation, an operator will depress a brake pedal (not shown) to move the push rod 62 inwardly and carry with it the plungers 60. This will, because of the articulated link 64 cause the valve operating members 52 to move inwardly of the bore whereby the tubular projection 50 seats on the forward end of the tubular poppet 38 closing off the return flow from port 24 to port 29. Further movement of the operator-operated member will then unseat the surface 72 from the face of the ring 74 whereby the high pressure fluid in the chamber 84 will be ported to a reaction chamber 102 to act against the disc 48 and traverse, by way of the cross drill 76 and the passage through the tubular poppet 38 to the ports 24 and 26 and out to the respective braking structures 28 and 30. The fluid pressure acting on the disc 48 will be proportioned between the housing by way of the collar 44 and the cup shaped retainer 46 and the valve operating member 52 to provide the operator with a sense of feel.

It should be realized that if there is a failure in the respective lines communicating the brake valve means 10 to the brakes 28 and 30 or in one or the other of the accumulators 16 and 18, that the other system will remain intact and operable by the operator-operated control member. In such a situation the cam surfaces 66 or 68 of the articulated link 64 will permit the accomplishment of the necessary valve travel for operating the intact side of the system while allowing greater displacement of the valve operating member on the failed side of the system.

As will be appreciated by those skilled in the art the system of FIGURE 3 would provide an even greater degree of fluid system separation for the operation of the respective brakes 28' and 30'.

In regard to FIGURE 1 the ends of plungers 52 abut on the cam surfaces 66 and 68 within the link 64 on a line which passes through the center of the pin 71. The sides 73 in the normal attitude are spaced from retainer 46. However, in the event of failure of one or the other member 52 to supply pressure which reacts thereon, the sides 73 of link 64 are stopped by collar 46 such that the non-failed plunger 52 may be actuated to open valve 38, as above, with substantially the same mechanical advantage, as if the failed plunger 52 were operable. It should be noted that this stopping of link 64 will prevent undue loads between projection 50 and poppet 38 which otherwise could cause valve damage. Also, this stopping of link 64 maintains substantially the same travel requirement for push rod 62 to operate the non-failed valve as if both valves were functioning.

In the structure of FIGURE 3 these same advantages occur in that link 64' will be picked up by abutment surface 85 after a failure of one or the other of the valves to provide a mechanical link between plunger 60' and the non-failed member and the link 64' is stopped by the cap in this attitude to preclude undue valve loading.

Furthermore, the construction of the valve shown by FIGURES 1 and 3 provides stops for actuation and return of the valve operating members which are on the housing structure. This provides control over valve travel.

I claim:
1. A tandem fluid control valve comprising:
    a housing having parallel bores therein each of which is provided with fluid inlet means, fluid outlet means and fluid return means;
    valve means in each of said bores including valve poppets adapted to cooperate with valve seats and valve operating members in each of said bores to normally communicate said outlet means to said return means and upon actuation of said valve operating member close such while opening communication of said inlet means to said outlet means; and
    means to actuate each of said valve operating members including a reciprocating plunger slidably carried by said housing and an articulated member attached to an end of said plunger within said housing which articulated member has a cam surface abutting an end of said valve operating member on a line passing through the connection of said articulated member to said reciprocating plunger.

2. A tandem control valve according to claim 1 wherein each of said valve seats has a face cooperating with an angled surface on each of said valve poppets, said face and said surface being formed at different angles, said valve seats having a plastic ring having limited deformability formed to have an angled face flush with each face of the valve seats such that seating contact of said surface of each of said valve poppets starts on a line equal in diameter to the diameter of a valve stem supporting each of said poppets in said housing to provide a balanced valve poppet through each of said valve seats, which seating contact increases in band width as the fluid pressure differential across said poppets from the ring side of said valve seats increase which would tend to increase the the seating force of the poppets on the seats whereby increasing fluid pressure forces ensure the seating of the poppet on said ring.

3. In a fluid pressure control valve, a valve means for controlling delivery and release of fluid pressure therethrough, said valve means comprising:
    a valve poppet having a tubular body with an angled surface thereabout, which angled surface is between a small diameter portion and a larger diameter portion of said body;
    a valve seat affixed in said control valve and arranged to receive the small diameter portion of said body therethrough, said seat having an angled face formed by a plastic ring cut at an angle cooperating with said angled surface, which angle for said ring is greater with respect to an axis of said tubular body than said angled surface has with respect to said same axis; and
    means to normally maintain said valve poppet in said control valve in a position where said surface and said face have a line contact area equal to the larger diameter portion of said body such that the net effect of fluid pressure about said poppet will cause a seating force urging said poppet onto said seat.

4. The structure of claim 3 wherein said tubular body of said valve poppet is the flow passage for working pressure supplied by the control valve whereby this working pressure is effective on the larger diameter portion to assist seating of the valve poppet.

5. A fluid pressure control valve comprising:
a housing;
a valve means in said housing;
a valve operating means operatively connected to said valve means in said housing; and
an operator-operated means having a plunger slidably projecting into said housing with a link articulated to the end of said plunger within said houisng, said link having a cam surface in abutting line contact with said valve operating means, said cam surface being on a line passing through the center of articulation for said link with said plunger.

6. A fluid pressure control valve according to claim 5 and further comprising reaction means sealingly mounting said valve operating means to said housing such that said reaction means proportions reaction pressure of fluid passing through said control valve between said housing and said valve operating member.

7. A tandem fluid control valve comprising:
a housing having separate parallel bores therein each of which is provided with its own fluid inlet means, fluid outlet means and fluid return means;
valve means in each of said bores including valve poppets adapted to cooperate with valve seats and valve operating members in each of said bores to normally communicate said outlet means to said return means and upon actuation of said valve operating member close such while opening communication of said inlet means to said outlet means; and
means to actuate each of said valve operating members including a reciprocating plunger slidably carried by said housing and an articulated member attached to an end of said plunger within said housing which member has a cam surface abutting an end of said valve operating member on a line passing through the connection of said articulated member to said reciprocating plunger.

References Cited
UNITED STATES PATENTS

| | | | |
|---|---|---|---|
| 2,545,529 | 3/1951 | Obecny | 137—596.2 XR |
| 2,752,947 | 7/1956 | Hruska | 137—596.2 |
| 2,927,737 | 3/1960 | Zeuch et al. | 251—333 XR |
| 2,939,401 | 3/1960 | Cowan | 251—333 XR |
| 2,994,334 | 8/1961 | Loveless | 137—116.5 XR |
| 3,085,836 | 4/1963 | Alfieri | 303—53 |

HENRY T. KLINKSIEK, Primary Examiner

U.S. Cl. X.R.

303—6, 10, 52